United States Patent Office 3,285,911
Patented Nov. 15, 1966

3,285,911
1,4 - METHANODIBENZO(1,2)THIAZINES PRODUCED FROM N-SULFINYLANILINES
Guy Robert Collins, Concord, Calif., assignor to The Dow Chemical Company, Midland, Mich., a corporation of Delaware
No Drawing. Filed Nov. 29, 1963, Ser. No. 327,040
13 Claims. (Cl. 260—243)

This invention relates to a new cyclization reaction of N-sulfinylanilines and to novel chemical compounds which are thereby obtained. It also relates to novel derivatives of these products.

N-sulfinyl aromatic amines, which have the general formula Ar—N=S=O, are known to react with 1,3-dienes to produce substituted 1,2-thiazine oxides according to the equation

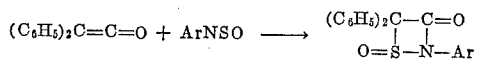

Recently, Beecken and Korte (Tetrahedron 18, 1527 (1962)) described the reaction of N-sulfinylanilines with diphenylketene which involved a 1,2-addition to form a cyclic product.

$(C_6H_5)_2C=C=O + ArNSO \longrightarrow \begin{matrix}(C_6H_5)_2C-C=O\\ | \quad\quad |\\ O=S-N-Ar\end{matrix}$ A few other reactions of N-sulfinylanilines involving 1,2-addition to a carbonyl group or to carbon-nitrogen unsaturation in analogous fashion have also been reported.

A new type of cyclization reaction has now been found wherein there is addition of a highly activated olefinic bond to an N-sulfinylaniline which involves not only the nitrogen-sulfur unsaturation, but also the benzene ring of the aniline. The products of this new reaction are hexahydrodibenzothiazines of radically different structure and properties from those of previously known sulfinylaniline reaction products.

More particularly, N-sulfinylanilines of the formula

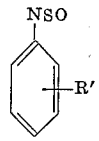

have been found to react with the olefinic bond in norbornene and certain substituted bicycloheptenes of the formula

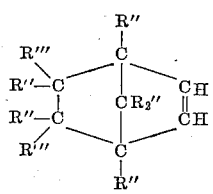

to produce benzothiazines of the formula

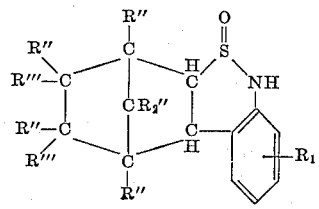

wherein R' is a substituent which is unreactive under the reaction conditions, for example, hydrogen, lower alkyl, lower alkoxy, phenyl, halogen, or nitro, R'' and R''' are similarly unreactive substituents and preferably R'' is hydrogen or methyl and R''' is hydrogen, methyl, or cyano, not more than one R''' being cyano. Of particular interest are the reaction products derived from norbornene itself and cyanonorbornene and such products wherein the substituent on the aromatic ring of the sulfinylaniline has been modified by further reaction, for example, by reduction of a nitro substituent to an amino group, or where an alkyl group has been attached to the nitrogen atom. These products are represented by the structural formula:

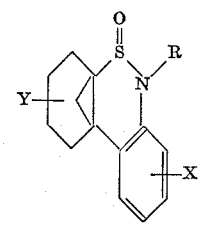

wherein Y is cyano or hydrogen, R is hydrogen or lower alkyl, and X is hydrogen, lower alkyl, lower alkoxy, phenyl, halogen, $NO_2$, or $NH_2$. By the terms lower alkyl and lower alkoxy are meant groups containing 1–4 carbon atoms such as methyl, ethyl, isopropyl, butyl, methoxy, ethoxy, and butoxy.

The chemical nomenclature used herein is consistent with that employed by Chemical Abstracts. The numbering according to that system of the heterocyclic structures described in this specification is shown below.

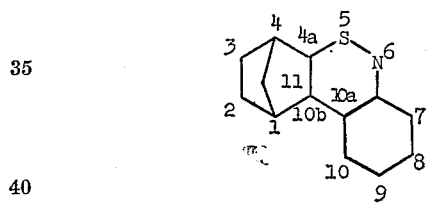

1,4,methano (6H) dibenzo(c,e)(1,2)thiazine nucleus

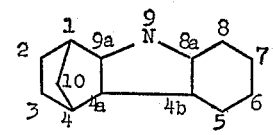

1,4-methanocarbazole nucleus

The diagrammatic structure

is employed in the specification and in the claims to signify the structure

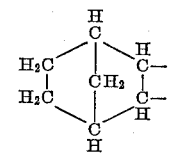

The addition reaction is accomplished merely by contacting the two reactants at a temperature above about 50° C. Preferably, the reaction is carried out in inert solvent solution at about 50–300° C. While the ratio of reactants is not critical to success, best results are usually obtained when at least about one mole of the olefin is employed per mole of sulfinylaniline. Conveniently, the reaction is run at the reflux temperature of a solvent such as toluene or xylene in which the reaction product is only slightly soluble and so is largely precipitated from the reaction mixture upon cooling. Product separation is thereby simplified and optimum yields are obtainable.

*Example 1*

In a reaction flask equipped with a stirrer, a nitrogen inlet, and a reflux condenser vented through a calcium chloride drying tube, 13.9 g. of N-sulfinylaniline and 9.4 g. of norbornene were dissolved in 300 ml. of toluene. The reaction mixture was heated to its reflux temperature and was maintained at this temperature for 72 hours under a blanket of nitrogen. During the course of the reaction, the mixture became dark and solids formed around the stirrer blade and the thermometer well. The reaction mixture was chilled in an ice bath and filtered to separate the solid product. The product was recrystallized from aqueous ethanol to yield 19.2 g. of 1,2,3,4,4a,10b-hexahydro-(6H) - 1,4 - methanodibenzo(c,e)(1,2)thiazine-5-oxide as a white, crystalline solid, M.P. 230–232° C. Elemental analysis of this material showed 67.0%, C, 6.54% H, and 5.98% N; calculated for the compound named, 67.0% C, 6.49% H, 6.01% N. Infrared spectra were consistent with the structure of the named compound.

*Example 2*

2-N-sulfinylaminobiphenyl was prepared by the conventional reaction of 2-aminobiphenyl with thionyl chloride in refluxing benzene. Using the procedure of Example 1, 10.75 g. of 2-N-sulfinylaminobiphenyl and 4.7 g. of norbornene were combined in 200 ml. of toluene and the mixture was heated at reflux temperature for 96 hours. The solids which separated from the cooled reaction mixture were collected by filtration and recrystallized from methylcyclohexane to yield 9.4 g. of 1,2,3,4,4a,10b-hexahydro-7-phenyl-(6H) - 1,4 - methanodibenzo(c,e)(1,2)thiazine-5-oxide as white needles melting at 187–189° C. The structure was confirmed by elemental analysis and infrared examination.

Various substituted N-sulfinylanilines were prepared by reacting the substituted aniline with thionyl chloride. These products were then reacted with norbornene by the procedure of Example 1 to obtain the expected hexahydrodibenzothiazines. In addition, 5-cyanonorbornene was reacted with N-sulfinylaniline to obtain the cyano-substituted product. These results are summarized in the table which follows. Equal molar proportions of reactants were used except as noted. Yields in all examples are based on the amount of starting sulfinylaniline.

*Examples 3–7*

| Reactants | | Product | Melting Point, °C. | Percent Yield |
|---|---|---|---|---|
| N-sulfinyl-aniline | Norbornene | | | |
| p-Nitro- | Norbornene | [structure with NO₂] | 260.5 d | 42.5 |
| p-Methyl- | do | [structure with CH₃] | 211–214 d | 1 20.2 |
| p-Methoxy- | do | [structure with O–CH₃] | 188–190 | 10.6 |
| p-Chloro- | do | [structure with Cl] | 196–196.5 d | 73 |

Examples 3–7—Continued

| Reactants | | Product | Melting Point, °C. | Percent Yield |
|---|---|---|---|---|
| N-sulfinyl-aniline | Norbornene | | | |
| Unsubstituted | 5-cyanonorbornene | 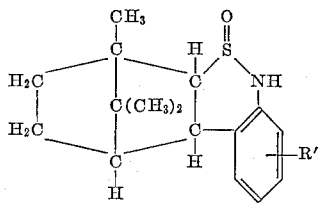<br>(mixed 2 and 3 isomers) | 259–260 d | 7.7 |

[1] Yield was increased to 60% based on the sulfinylaniline by using a 10/1 molar excess of norbornene.

As shown in the case of the p-methyl-N-sulfinylaniline reaction, improved yields are obtained when an excess of the cyclic olefin is employed.

Examples 8 and 9 illustrate further reaction of products from previous examples.

Example 8

To a reaction flask there was added 15.5 g. of 1,2,3,4,4a,10b - hexahydro-(6H)-9-nitro - 1,4 - methanodibenzo (c,e)-(1,2)thiazine-5-oxide (from the reaction of norbornene with p-nitro-N-sulfinylaniline), 1.55 g. of glacial acetic acid, 62 g. of iron filings, 186 g. of ethyl alcohol, and 93 ml. of water. This mixture was stirred for 6 hours at its reflux temperature. The reaction mixture was filtered hot, the filtrate was made alkaline by addition of solid potassium carbonate, and filtered again. Evaporation of the solvent from the filtrate yielded 11 g. of a tan solid. The recrystallized product was cream colored needles, melting at 198–200° C. with some decomposition. Elemental and infrared analysis showed this compound to be 9-amino-1,2,3,4,4a,10b-hexahydro-(6H)-1,4-methanodibenzo(c,e)(1,2)-thiazine-5-oxide.

Example 9

To a solution of 2.33 g. of the product of Example 1 and 0.6 g. of NaOH in aqueous tetrahydrofuran there was added 1.8 g. of dimethyl sulfate. This solution was heated and stirred for one hour. The solution was diluted with water and cooled to cause precipitation of unreacted starting material. The filtrate from the cooled solution was evaporated under reduced pressure to obtain a residue which upon recrystallization from methylcyclohexane gave colorless needles, M.P. 140–142° C. Infrared and elemental analysis showed this material to be the N-methylated compound, 1,2,3,4,4a,10b-hexahydro-(6H)-6-methyl-1,4-methanodibenzo(c,e)(1,2)thiazine-5-oxide.

By the general procedure of Examples 1–8 N-sulfinylaniline and substituted N-sulfinylanilines as shown above are reacted with methyl-substituted norbornenes as previously described to obtain the corresponding dibenzothiazines. Bornylene being a readily available methylated reactant, its reaction products are of particular interest. These products have the structure where R' is a radical as defined above. These products are alkylated as shown in Example 9 to give the N-alkyl compound. Where R' is nitro, this is reducible to an amino group as shown in Example 8. These compounds derived from bornylene and other methylated norbornenes have properties closely similar to those of the compounds prepared in the above examples.

The compounds of this invention are useful for the control of parasitic worms in animals. Mice which were infected with such parasites as mouse tapeworms and mouse trichostrongylid larvae were found to be substantially free of these worms after having been fed for several days with a diet containing 0.06% by weight of one or more of these compounds.

These compounds are also useful as chemical intermediates for the preparation of new bridged carbazoles. The preparation of these carbazoles also serves as a confirmatory proof of structure for the dibenzothiazines described above. It has been found that by reacting such dibenzothiazines with Raney nickel or equivalent desulfurizing reducing catalyst containing adsorbed hydrogen such as Raney cobalt in a lower alkanol, a bridged hexahydrocarbazole is produced according to the following reaction:

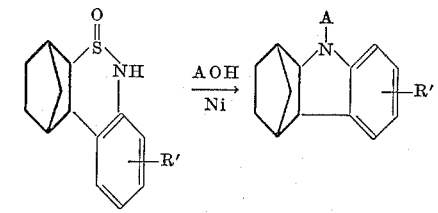

In the above equation, R' represents a group as previously defined and A is lower alkyl. The reaction is carried out by contacting the reactants at moderate temperatures, using an excess of the nickel catalyst. Example 10 is illustrative.

Example 10

A mixture of 27 g. of 1,2,3,4,4a,10b-hexahydro-1,4-methano-(6H)-dibenzo(c.e.)(1,2)thiazine-5-oxide, 520 g. of wet Raney nickel (65% Ni), and 500 ml. of ethyl alcohol was stirred at its reflux temperature for 26 hours. The nickel was then removed by filtration and the ethanol was evaporated under reduced pressure. Fractional distillation of the residual liquid yielded 17.3 g. of a viscous, colorless liquid, B.P. 166–170° C./14–15 mm. Hg. This material was identified by infrared spectroscopy and by nuclear magnetic resonance measurements as being 9-ethyl-1,2,3,4,4a,9a-hexahydro-1,4-methanocarbazole. The methyl iodide quaternary salt of this compound was prepared by the conventional method. The recrystalized methiodide obtained was found to melt at 165–166° C. Elemental analysis of this salt showed 54.3% C, 6.74% H, 3.98% N; calculated for $C_{16}H_{22}NI$: 54.1% C, 6.25% H, 3.95% N.

By the method shown in Example 10, the substituted dibenzothiazines described in this specification are converted to the corresponding substituted N-alkylhexahydromethanocarbazoles. Substitution of methyl alcohol, propyl alcohol, or butyl alcohol for the alcohol shown in the above example yields the corresponding N-alkyl compound.

These carbazoles are useful contact insecticides, aqueous dispersions of 500 p.p.m. giving effective control of insects such as flies and cockroaches.

I claim:
1. A compound of the formula

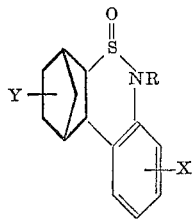

wherein R is selected from the group consisting of hydrogen and lower alkyl, X is selected from the group consisting of hydrogen, lower alkyl, lower alkoxy, phenyl, halogen, $NO_2$, and $NH_2$, and Y is selected from the group consisting of hydrogen and cyano.

2. 1,2,3,4,4a,10b-hexahydro-(6H)-1,4-methanodibenzo(c,e)(1,2)thiazine-5-oxide.

3. 1,2,3,4,4a,10b-hexahydro-7-phenyl-(6H)-1,4-methanodibenzo(c,e)(1,2)thiazine-5-oxide.

4. 1,2,3,4,4a,10b-hexahydro-(6H)-9-nitro-1,4-methanodibenzo(c,e)(1,2)thiazine-5-oxide.

5. 1,2,3,4,4a,10b - hexahydro-(6H)-9-methyl-1,4-methanodibenzo(c,e)(1,2)thiazine-5-oxide.

6. 1,2,3,4,4a,10b-hexahydro-(6H)-9-methoxy-1,4-methanodibenzo(c,e)(1,2)thiazine-5-oxide.

7. 1,2,3,4,4a,10b-hexahydro-(6H)-6-methyl-1,4-methanodibenzo(c,e)(1,2)thiazine-5-oxide.

8. 9-chloro-1,2,3,4,4a,10b-hexahydro-(6H)-1,4-methanodibenzo(c,e)(1,2)thiazine-5-oxide.

9. A compound of the formula

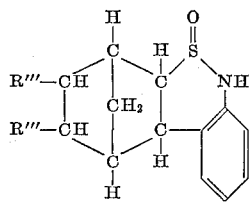

wherein one R''' is hydrogen and the other R''' is cyano.

10. 9 - amino-1,2,3,4,4a,10b-hexahydro-(6H)-1,4-methanodibenzo(c,e)(1,2)thiazine-5-oxide.

11. A process for making a compound of the formula

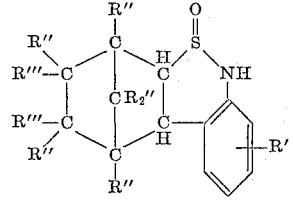

wherein R' is selected from the group consisting of hydrogen, phenyl, lower alkyl, lower alkoxy, and nitro, R'' is selected from the group consisting of hydrogen and methyl, and R''' is selected from the group consisting of hydrogen, methyl, and cyano, not more than one R''' being cyano, which process comprises reacting by contacting a cyclic olefin of the formula

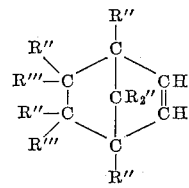

with a sulfinylaniline of the formula

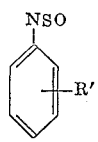

at a temperature of about 50° C. to about 300° C.

12. The process of claim 11 wherein the cyclic olefin is norbornene.

13. The process of claim 11 as carried out in inert solvent solution.

References Cited by the Examiner

UNITED STATES PATENTS

| | | | |
|---|---|---|---|
| 2,921,942 | 1/1960 | Grotta | 260—315 |
| 3,041,349 | 6/1962 | Bearse et al. | 260—315 |
| 3,198,793 | 8/1965 | Hilger et al. | 260—243 |
| 3,210,348 | 10/1965 | Rey-Bellet et al. | 260—243 |

WALTER A. MODANCE, *Primary Examiner.*

JOHN M. FORD, *Assistant Examiner.*